United States Patent Office 3,413,760
Patented Dec. 3, 1968

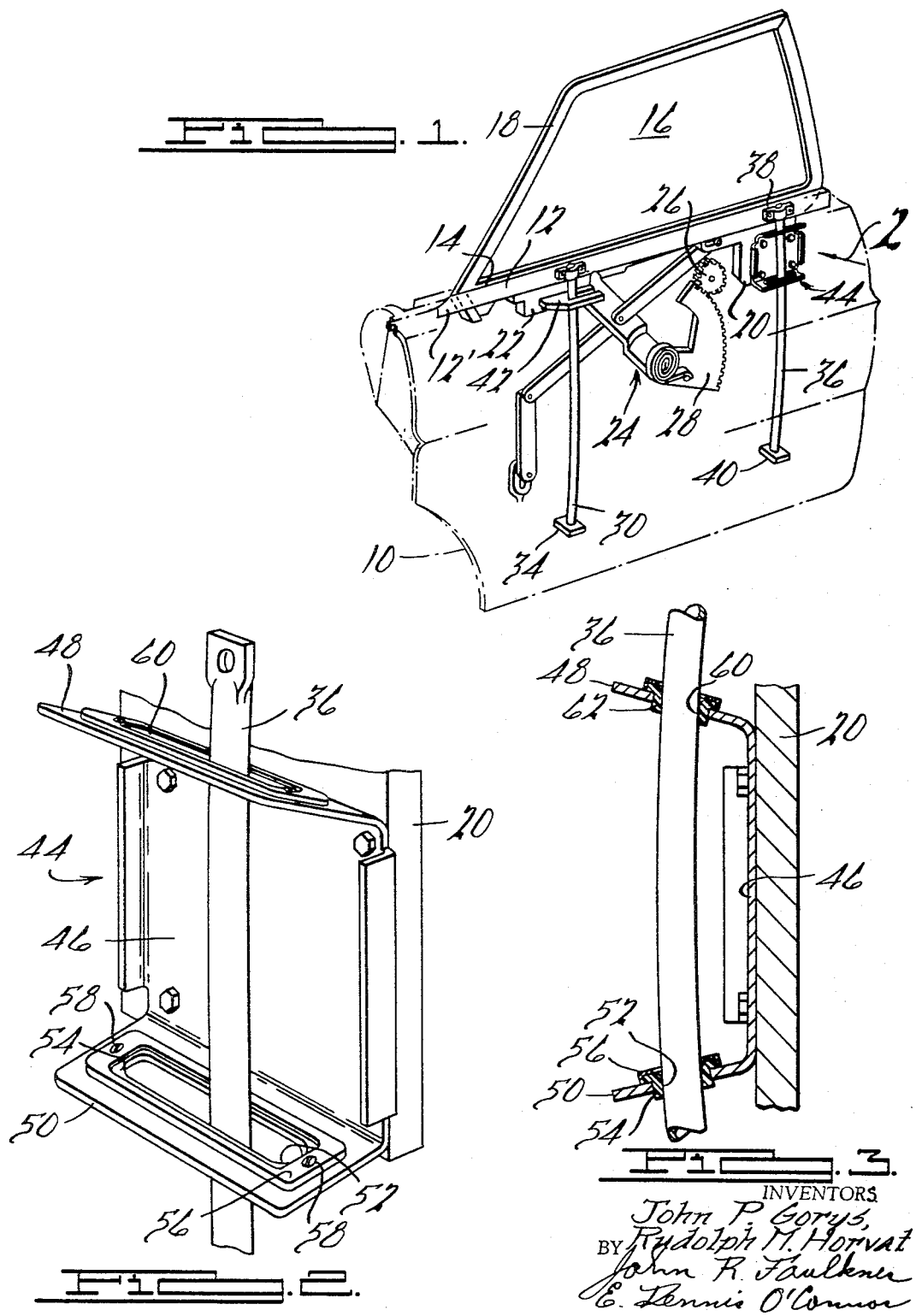

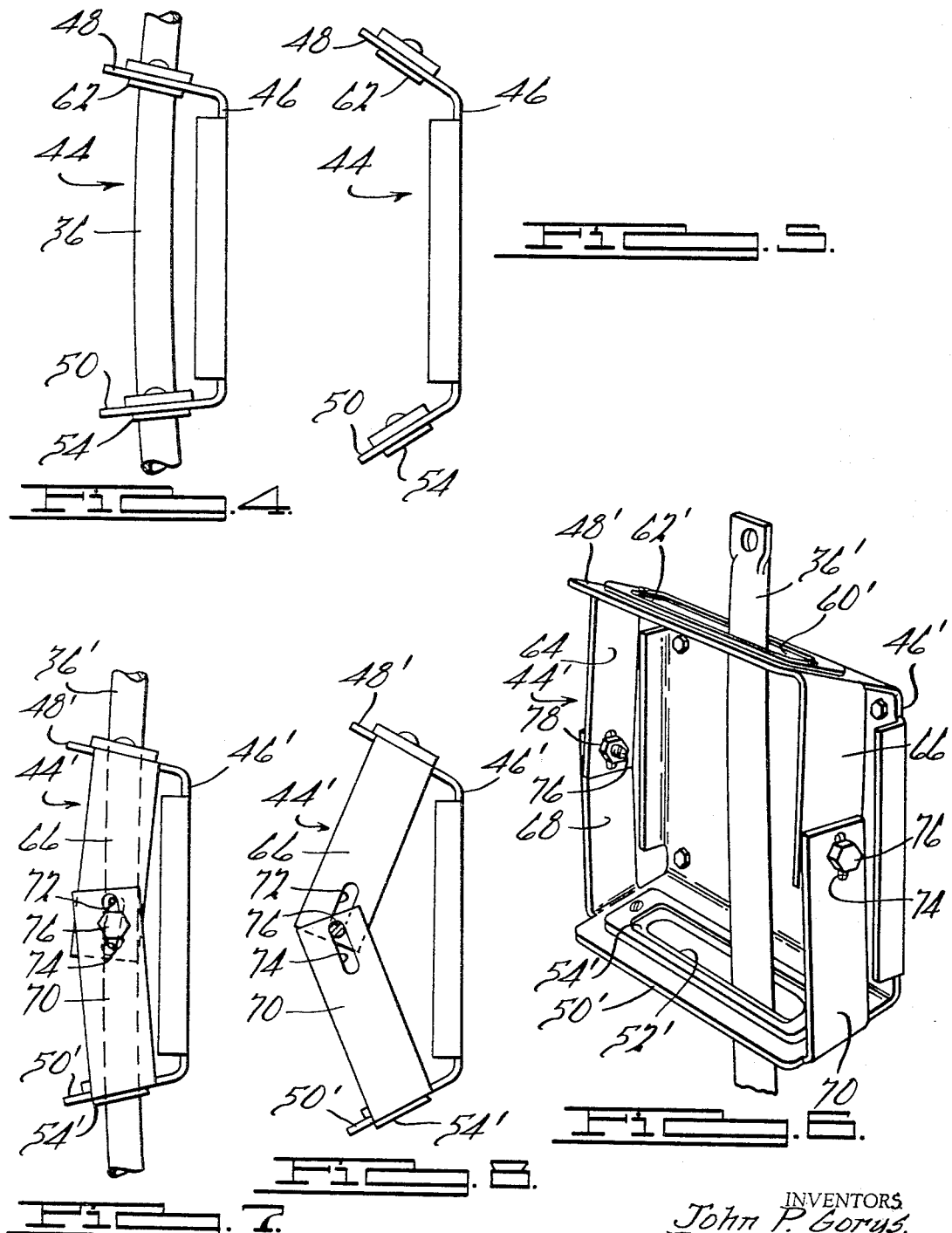

3,413,760
VEHICLE WINDOW CONTROL SYSTEM
John P. Gorys, Detroit, and Rudolph M. Horvat, Allen Park, Mich., assignors to Ford Motor Company, Dearborn, Mich., a corporation of Delaware
Filed Mar. 31, 1967, Ser. No. 627,513
8 Claims. (Cl. 49—375)

ABSTRACT OF THE DISCLOSURE

A vehicle window movement control system for stabilizing window panels that are movable in vertical and horizontal directions. The guide system, which cooperates with four bar linkage window operating mechanism, includes a rod functioning as a guide track and a guide member slidable along the rod to provide required stabilization. The guide member is capable of use with rods of varying cross sectional dimensions.

BACKGROUND OF THE INVENTION

In the automotive art, cross-arm window closure regulators utilizing the four bar linkage principle have gained wide acceptance for use in motivating movement of window closure panels. Regulators of this type can be used to provide fore and aft movement of the closure panels longitudinally of the vehicle body as well as conventional up and down movement. This so-called "two degree freedom" is necessitated by many modern vehicle body designs and allows both straight line and curvilinear panel movement in the plane of the panel. A problem arising due to the use of such a regulator is that means must be provided to prevent lateral movement of the closure panel in a direction normal to the plane of the panel inboard or outboard of the vehicle. United States patent application S.N. 603,371, filed Dec. 20, 1966, and assigned to the assignee of this invention, discloses guide means in combination with such a regulator for preventing unwanted lateral movement while permitting the requisite two degree freedom for the closure panel. These guide means include a rod functioning as a guide track and a closure panel guide member designed to have a sliding interference fit with the rod for sliding movement along the rod.

This invention provides a similar closure control system, but includes a closure panel guide mechanism having dimensions that are not critical relative to the dimensions of the rod and that may be utilized with rods of varying dimensions to obtain the desired sliding interference relationship with attendant design, manufacturing and assembly savings.

SUMMARY OF THE INVENTION

A guide mechanism for a vehicle closure panel constructed in accordance with this invention is utilized in combination with a motor vehicle body having a structural door member, a window opening and a window closure panel spaced from the door member and arranged substantially parallel thereto. Regulator means are operatively connected to the structural members and the panel for moving the latter relative to the former into and out of the aperture. A rod is secured to the panel and cooperates with guide means for permitting two degree freedom of movement of the panel in a plane parallel to the structural member while restraining panel movement towards and away from the structural member. The guide means comprise a substantially C-shaped element formed from resilient material, the body of the element operatively secured to the panel and the arms of the element having elongated apertures extending therethrough. The arms of the element are resiliently biased away from one another. The rod extends through the arm apertures and limits movement of the arms away from one another.

DESCRIPTION OF THE DRAWINGS

FIGURE 1 is an isometric view of a vehicle door and closure panel with parts cut away to show a first embodiment of a guide device for said panel construction in accordance with this invention;

FIGURE 2 is an enlarged isometric view of the right-hand guide of FIGURE 1 taken along the line of sight illustrated by the arrow 2 of FIGURE 1;

FIGURE 3 is a side elevation view of the guide device of FIGURE 2 with some parts in section;

FIGURE 4 is a side elevation view similar to FIGURE 3 and illustrating the orientation of the guide arms as assembled;

FIGURE 5 is a view similar to FIGURE 4 but illustrating the orientation of the guide arms prior to assembly;

FIGURE 6 is an isometric view of a second embodiment of guide mechanism constructed in accordance with this invention;

FIGURE 7 is a side elevation view of the device of FIGURE 6 as assembled; and

FIGURE 8 is a view similar to FIGURE 7 but illustrating the device of FIGURE 6 prior to assembly.

DETAILED DESCRIPTION OF THE INVENTION

Referring now in detail to the drawings and in particular to FIGURE 1, the numeral 10 denotes a door structural member of a vehicle body having a spaced parallel extension 12 connected to structural member 10 at its extremities by portions 12' (one shown). It may be seen that this arrangement provides a channel space 14 between structural member 10 and extension 12 that receives a window closure panel 16 having a frame 18. A pair of substantially vertical extensions 20 and 22 extend from the bottom of frame 18.

A conventional cross-arm four bar linkage window panel regulator 24 is utilized to promote the movement of window panel 16 up and down as well as fore and aft and is secured to both structural member 10 and from 18 of panel 16 as may be seen in FIGURE 1. It is sufficient to say, for purposes of this description, that regulator 24 is operated due to the interaction of a pinion 26, that may be motivated manually or by motor, with a gear sector 28 to activate the linkage connected to the window panel frame 18.

A substantially vertical guide rod 30 is secured to extension 12 of structural member 10 by a clamp 32 and to structural member 10 by a support 34. A similar guide rod 36 is secured in like manner by means of a clamp 38 and a support 40. Guides 42 and 44 are secured to extensions 20 and 22, respectively, and extend in a direction substantially perpendicular to the plane of closure panel 16. For purposes of comparison, guide 42 is illustrated as a guide constructed in accordance with the disclosure of the above-mentioned application S.N. 603,371, while guide 44, described in detail below, is the preferred embodiment of guide disclosed by this invention. It is to be understood that a guide similar to guide 44 may be substituted for guide 42.

Referring now to FIGURES 2 and 3, guide 44 may be seen as formed from a substantially C-shaped member constructed of resilient material such as spring steel and having a body 46 and slightly diverging arms 48 and 50. Arm 50 has an elongated slot 52 extending therethrough. Extending about the inner periphery of slot 52 is a bearing 54 of material having a low coefficient of friction such as nylon. Bearing 54 is held in place by a mounting plate 56 secured to arm 50 by fasteners 58. A slot 60, similar to slot 52, extends through arm 48 and has a bearing 62 mounted similarly to bearing 54.

The window control system is arranged so that rod 36 extends through slots 52 and 60, and the bearings 54 and 60, as will be discussed below, bear on rod 36 to produce a slightly frictional drag to movement of rod 36 and limit lateral movement of panel 16, but permit the desired two degree freedom of movement of the panel.

As illustrated in FIGURES 4 and 5, guide 44 is formed such that, prior to assembly, arms 48 and 50 are widely angularly divergent relative to their orientation after assembly. The deflection of arms 48 and 50 during assembly, so that slots 52 and 60 may receive rod 36, is within the elastic limit of the material of guide 44. After assembly (FIGURE 4), movement of arms 48 and 50 toward their original positions (FIGURE 5) is limited by the presence of rod 36. Bearings 54 and 62 thus contact rod 36 and exert forces on the rod, due to the resiliency of guide 44, causing a sliding interference relationship between the left edges (viewed in FIGURES 4 and 5) of bearings 54 and 62 and rod 36. It readily may be appreciated that this relationship is not dependent upon the dimensional width of the slots and the diameter of rod 36, that need only be smaller than the slot widths. Forming the slots of precise tolerances and precise sizing of rod 36 are, therefore, rendered unnecessary.

FIGURES 6, 7 and 8 illustrate a second embodiment of a guide useful in motor vehicles having severe inherent vibrations, or operated under conditions giving rise to severe vibrations that would tend to cause the guide arms to "walk or move slightly along the rod from the originally assembled position. Such movement possibly could lead to binding of the bearings against the rod when the window regulator is operated.

A guide 44′ is constructed similarly to guide 44 and includes body 46′; arms 48′, 50′; slots 52′, 60′; and bearings 54′, 62′. Prior to assembly (FIGURE 8), arms 48′ and 50′ are relatively widely diverging as compared to the orientation of said arms after assembly (FIGURE 7).

A pair of integrally formed projections 64 and 66 extend from arm 48′ towards arm 50′. A similar pair of projections 68 and 70 extend from arm 50′ towards arm 48′. Projections 66 and 70 have formed therethrough mating axially extending slots 70 and 72, respectively. Similar slots are formed in projection 64 and 68. Projections 64 and 68 and projections 66 and 70 are pivotally coupled and may be releasably secured against relative movement by bolts 76, extending through the pairs of mating slots, and cooperating nuts 78 (one shown).

During assembly, the projections 64, 66, 68 and 70 facilitate deflection of arms 48′ and 50′ to accommodate the reception of rod 36′ through slots 52′ and 69′. The elongated shape of the slots formed in the projections allow rods of varying diameters to be accommodated. Upon deflection of arms 48′ and 50′ to the desired position and the insertion of rod 36′, nuts 78 are tightened on bolts 76 to secure the paired projections against relative movement. This, of course, locks arms 48′ and 50′ against relative movement and prevents the arms from "walking" along the length of rod 36′.

This invention thus provides a vehicle window control system including a window panel guide mechanism that allows two degree freedom of movement for the window panel while preventing lateral movement of the panel. This mechanism is easily manufactured without precise sizing of parts and simple to assemble.

It is to be understood that this invention is not limited to the exact construction illustrated and described above, but that various changes and modifications may be made without departing from the spirit and scope of the invention as defined by the following claims.

We claim:

1. In an automobile body structure having a structural member, a window aperture and a window closure panel spaced from said structural member, a window aperture and a window closure panel spaced from said structural member and generally parallel thereto, a regulator means operatively connected to said member and said panel for moving the latter relative to the former into and out of said aperture, a guide rod secured to said structural member and substantially parallel to said panel, the improvement comprising: at least a pair of guide means secured to said panel, each of said guide means having a slot formed therethrough receiving said rod, said guide means bearing on said rod at two points of contact spaced along the length of said rod, and resilient means exerting a force on each of said guide means to maintain said guide means in intimate contact with said rod at said two points of contact.

2. The combination of claim 1, wherein said guide means comprise a substantially C-shaped element formed from resilient material, the body of said C-shaped element operatively secured to said panel, each of the arms of said C-shaped element having an elongated aperture formed therethrough, said arms being resiliently biased away from one another, said rod extending through said apertures and limiting movement of said arms away from one another.

3. The combination of claim 2, including a pair of support means, each of said support means extending from one of said arms and pivotally joined together, and locking means releasably securing to one another said support means for preventing relative movement of said support means.

4. In an automobile body structure having a structural member and a window panel spaced from said structural member and generally parallel thereto, a window panel guide device including window regulator means operatively connected to said structural member and said panel for moving said panel relative to said structural member, a guide rod secured to said structural member and substantially parallel to said panel, the improvement comprising: rod guide means including a pair of spaced apart guide members having apertures formed therethrough, said guide members operatively secured to said panel, said rod extending through said apertures, and resilient means interconnecting said guide members and exerting a force on each one of said guide members.

5. The combination of claim 4, wherein said guide members are operatively secured to said structural panel in divergent relationship, the force on each of said guide members tending to increase the degree of divergence, said rod limiting the degree of divergence.

6. The combination of claim 4, including a support member extending from each one of said guide members into the space between said guide members, and means for pivotally attaching and releasably locking said members to one another.

7. The combination of claim 4, said rod guide means being a substantially C-shaped spring element, said guide members comprising the arms of said element and said resilient means comprising the body of said element, said body operatively secured to said panel.

8. The combination of claim 7, wherein said C-shaped element is formed with said arms being divergent, said arms being forced towards one another to receive said rod.

References Cited

UNITED STATES PATENTS 3,093,404    6/1963    Probst _____ 49—351 X

FOREIGN PATENTS 868,658    5/1961    Great Britain.

DAVID J. WILLIAMOWSKY, *Primary Examiner.*

J. KARL BELL, *Assistant Examiner.*